(12) United States Patent
Torum (10) Patent No.: US 12,077,331 B2
(45) Date of Patent: Sep. 3, 2024

(54) PACKING CELLS AND METHODS (71) Applicant: ABB SCHWEIZ AG, Baden (CH)

(72) Inventor: Gursen Torum, Istanbul (TR)

(73) Assignee: ABB Schweiz AG, Baden (CH)

( * ) Notice: Subject to any disclaimer, the term of this patent is extended or adjusted under 35 U.S.C. 154(b) by 504 days.

(21) Appl. No.: 17/421,989

(22) PCT Filed: Jan. 10, 2019

(86) PCT No.: PCT/EP2019/050588
§ 371 (c)(1),
(2) Date: Jul. 9, 2021

(87) PCT Pub. No.: WO2020/143918
PCT Pub. Date: Jul. 16, 2020

(65) Prior Publication Data
US 2022/0111985 A1    Apr. 14, 2022

(51) Int. Cl.
*B65B 35/50* (2006.01)
*B25J 9/00* (2006.01)
(Continued)

(52) U.S. Cl.
CPC ............. *B65B 35/50* (2013.01); *B25J 9/0093* (2013.01); *B65B 5/105* (2013.01); *B65B 59/04* (2013.01); *B65G 57/08* (2013.01)

(58) Field of Classification Search
CPC ......... B65B 35/50; B65B 5/105; B65B 59/04; B25J 9/0093; B65G 57/08
See application file for complete search history.

(56) References Cited

U.S. PATENT DOCUMENTS 5,348,440 A * 9/1994 Focke ............... B65G 61/00
414/793
8,997,438 B1 * 4/2015 Fallas ............... B25J 9/0093
901/17
(Continued)

FOREIGN PATENT DOCUMENTS

CN       102756822 A    10/2012
WO    WO2014075151 A1  5/2014

OTHER PUBLICATIONS

International Search Report and Written Opinion of the International Searching Authority, International Application No. PCT/EP2019/050588 issued by the European Patent Office, mail date Oct. 17, 2019, 11 pages, European Patent Office, Rijswijk, NL.

*Primary Examiner* — Andrew M Tecco
*Assistant Examiner* — Nicholas E Igbokwe
(74) *Attorney, Agent, or Firm* — Peter B Scull (57) ABSTRACT

A packing cell for packing products in boxes includes a picking system for picking products and stacking them according to a stacking pattern, a support unit for the stacking process, with a rotatable horizontal shaft for placing a support platform in a predetermined angular position for the stacking process, and a box handling robot to transfer empty boxes towards the support unit and full boxes away from the support unit. A method includes placing the support platform in a predetermined angular position adjacent a product picking system, picking and stacking a number of products according to a stacking pattern on the support unit, and removing from the support unit, with a box handling robot, a box containing the stacked products.

15 Claims, 6 Drawing Sheets

(51) Int. Cl.
  *B65B 5/10* (2006.01)
  *B65B 59/04* (2006.01)
  *B65G 57/08* (2006.01)

(56) References Cited

U.S. PATENT DOCUMENTS

| | | | |
|---|---|---|---|
| 9,227,323 B1* | 1/2016 | Konolige | H04N 5/33 |
| 11,072,141 B1* | 7/2021 | Frederick | B31B 50/58 |
| 11,524,808 B2* | 12/2022 | Nishitsuji | B65B 5/105 |
| 2013/0283731 A1 | 10/2013 | Komp | |
| 2017/0203861 A1* | 7/2017 | Van Halsema | B65B 43/52 |

* cited by examiner

PACKING CELLS AND METHODS

The present disclosure relates to packing cells for packing products in boxes, with a picking system for picking products and stacking them according to a stacking pattern, as well as to packing methods. Such packing cells and methods provide a flexible and efficient packing operation, which may be easily and quickly adapted to different product types, box types and stacking patterns.

BACKGROUND

It is known to pack a number of products into a box of a certain shape and type, for example "A box" case, wrap-around case, display box case, etc. The products may be arranged in each box according to different stacking patterns, e.g. vertical, horizontal, single or double array, etc. In a packing system, products may for example be fed on a conveyor and transferred by a picking robot into boxes of a certain case type, according to a certain stacking pattern; in other examples the products may be collated into a packing pattern on a blank, and the blank may then be wrapped around the products.

In known packing systems and solutions, the change from working with one case kind and stacking pattern to working with a different case kind and/or a different stacking pattern involves making substantive changes in the configuration of the system in order to position the boxes in a suitable way, allow the movements of the picking robot required for a certain stacking pattern, etc. Even in simple changes such as from horizontal stacking pattern to vertical stacking pattern the system model needs to be changed; for different sizes of the same case type the whole mechanism of belts, stoppers, flaps etc. must be changed in order to shift from one size to another.

The changes from one case kind and stacking pattern to another are therefore time consuming, involving significant downtimes of the line, require having available several different and sometimes cumbersome units which are only used part of the time and need to be stored when not in use, etc.

It would therefore be desirable to improve the flexibility and efficiency of known packing and stacking systems, such that they are able to work with different case types and stacking patterns with minimum and quick adaptations.

SUMMARY

According to one aspect, the present disclosure provides a packing cell for packing products in boxes, including a picking system for picking products and stacking them according to a stacking pattern, a support unit for the stacking process, the support unit including a support platform and a rotatable horizontal shaft for placing the support platform in a predetermined angular position for the stacking process, and a box handling robot arranged to transfer empty boxes towards the support unit and full boxes away from the support unit.

Such a packing cell, where a support unit intended for stacking products thereon, has a rotatable support platform that can be placed in different angular positions, allows adapting the cell to different stacking patterns, e.g. horizontal stacking or vertical stacking, simply by rotating the support platform, without the need to make any further change, and therefore provides a flexible and efficient packing system, which can be easily and quickly adapted to different packing operations. Furthermore the box handling robot, by virtue of its programming potential, allows feeding and removing boxes in any suitable position of the support unit.

The box handling robot may be adapted to transfer empty boxes towards the support unit prior to the stacking operation, so the boxes are filled with products according to a stacking pattern and then removed by the robot; alternatively, the box handling robot may be adapted to transfer empty boxes towards the support unit after the stacking operation, such that products that are stacked on the support unit itself are then transferred to the empty boxes, and then the boxes are removed by the robot. In examples of the present disclosure, the support platform may include a tool changer master plate, and the packing cell may further include one or more build-up bases, each provided with a tool changer tool plate adapted to be coupled to the tool changer master plate of the support unit.

The support unit together with a build-up base mounted thereon make an easily configurable stack positioner, on which a stack of products may be formed by the picking system in a desired stacking pattern.

The provision of several build-up bases each configured for a box type and/or stacking pattern, which may be selectively coupled to the support unit, results in a very flexible packing cell, which is suitable to handle different types of boxes and stacking patterns, and for which any new arrangement may be added simply by providing a build-up base, without the need for changes in the overall layout and configuration of the cell. The attachment of the build-up bases to the support unit using a tool changer system, with mating parts on the support platform of the support unit and on the build-up bases, allows for fast and efficient changes from working e.g. with one box type to working with another.

The build-up base or bases may include a bottom and one or more walls defining between them a holding space: the holding space may be configured to hold products stacked in it by the picking system and intended to be transferred into a box in a subsequent step, or may alternatively be configured to hold a box, so the box may directly receive the products from the picking system.

In some examples one or more of the walls may be rotatable and/or linearly displaceable. This allows adapting the build-up base to different kinds and sizes of products, stacking patterns, etc., and also moving the walls between a stacking position in which they allow some tolerance in the stacking operation, so the picking system may operate faster, and a transfer position in which they are moved closer to each other to enclose the products in a smaller volume, so a smaller box may be used, so transport and storage costs may be saved.

In examples of packing cells according to the present disclosure, a cell may include two or more stack positioners, i.e. two or more support units, such that one may be in operation to receive products from the picking system while boxes may be uploaded and/or downloaded from the other. Furthermore, in some examples the two stack positioners may be provided with different build-up bases and/or have the support platform arranged in different positions, to allow simultaneously packing different types of boxes and stacking patterns.

According to another aspect, the present disclosure also provides a packing method for packing products in boxes, including operating a support unit to place a support platform mounted on a rotatable shaft in a predetermined angular position adjacent a product picking system, operating the picking system to pick and stack a number of products according to a predetermined stacking pattern on the support unit, and operating a box handling robot to remove from the support unit a box containing the stacked products.

In some examples, at least two build-up bases, adapted to different box types, may selectively be mounted on the support platform of the support unit to form different stack positioners. The mounting of the different build-up bases on the support unit may be made by providing mating tool changer elements, as disclosed herein for implementations of the packing cell, so the method may allow packing products in several types of boxes and in several desired stacking patterns, efficiently and with minimum downtimes.

In examples of the method, the handling robot may be operated to place an empty box on the stacked products once they have been stacked on the support unit, for example at least partly around the walls of a build-up base on which the products are stacked, and the support platform may then be rotated such as to transfer the stacked products into the empty box, before the handling robot removes the box from the support unit. In some implementations of the method, the handling robot may rotate the box synchronized with the rotation of the support platform; in alternative examples, the box handling robot may place the empty box on the stacked products and withdraw (for example to load or remove a full box from another support unit of the same packing cell), while the support platform rotates to transfer the stacked products into the empty box, with a gripper of the support unit at the same time retaining the box to prevent its disengagement, and the box handling robot may then remove the full box after it is released in a lower position by the support unit.

In other examples of methods hereof, the box handling robot may first place an empty box on the support unit so the box receives the products from the picking system, and the box handling robot may then remove the box from the support unit after the products have been stacked therein by the picking system.

DESCRIPTION OF THE DRAWINGS

Non-limiting examples of the present disclosure will be described in the following, with reference to the appended drawings, in which.

DETAILED DESCRIPTION

A packing cell according to implementations of the present disclosure may be operated to pack products, for example personal articles, objects, cans, bottles, packaged food products, or any other kind of product, in boxes of several different kinds and shapes.

Throughout the description and claims, the word "boxes" is employed to refer to boxes, cases, cartons or any similar container, which may be made of cardboard, plastic or other materials and employed for storing, transporting, shipping or otherwise handling a number of articles or products. The products may be arranged in each box according to different stacking patterns, e.g. vertical or horizontal, in single array, in double array, etc. Products may for example be fed to the packing cell on a conveyor, and transferred by a picking robot or other handling device into the boxes in the packing cell.

Figure 1:
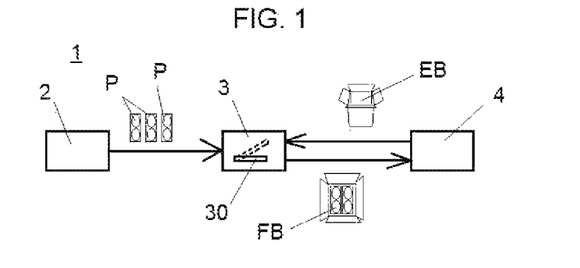
FIG. 1 is a schematic diagram of a packing cell according to examples disclosed herein.

As shown very schematically in the diagram of FIG. 1, a packing cell 1 may include a picking system 2 for picking products and stacking them according to a stacking pattern; a support unit 3 for the stacking process, and a box handling robot 4. The support unit 3 may include a rotatable support platform 30, i.e. a support platform mounted on a rotatable shaft (not shown in FIG. 1), which may adopt a suitable angular position for the stacking process: for example, it may be placed in horizontal position for a horizontal stacking pattern, or in a position inclined at an angle, suitable for stacking products in a vertical stacking pattern.

In such a packing cell 1, the support platform 30 of the support unit 3 may be placed in a suitable angular position adjacent the product picking system 2, and the picking system 2 may operate to pick and stack an array of products P according to a predetermined stacking pattern, using the support platform 30. The box handling robot 4 may transfer empty boxes EB towards the support unit 3, to be filled with stacked products, and transfer full boxes FB away from the support unit 3.

Figure 2:
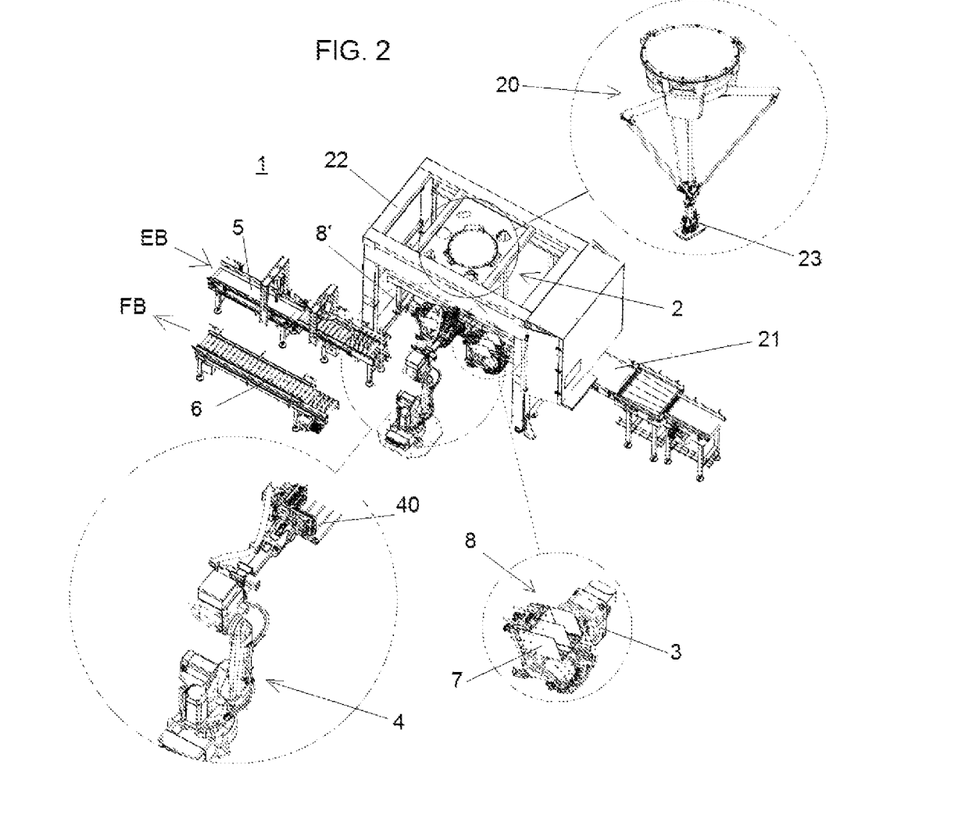
FIG. 2 is a perspective view of an example packing cell according to the present disclosure.

FIG. 2 shows in perspective view and in more detail a packing cell 1 according to an example. The packing cell 1 in FIG. 2 includes a picking system 2 which may include a picking robot 20 (see enlarged detail of FIG. 2); a product feeding conveyor 21, to feed the products to be packed to the position of the picking robot 20; a frame 22, to hold the picking robot 20, the support unit 3, a camera and a control unit (not shown), etc.; as well as a tool 23, which can hold the products and can quickly be connected/changed by a tool changer device to the picking robot 20. In this example the picking robot 20 may be a parallel robot, for example a model known as ABB FlexPicker™, available from ABB, Sweden.

The packing cell 1 also includes here a box handling robot 4 (see enlarged detail of FIG. 2), in this case an articulated serial robot, e.g. a six-axis robot, provided with a box handler 40 as an end effector, for example provided with a vacuum system on one or two sides, to hold a box in place during its movement. As shown, the box handling robot 4 may be mounted at one side of the product feeding conveyor 21 and the picking robot 20. A box feeding conveyor 5 may be arranged within reach of the box handling robot 4, for feeding empty boxes EB to the packing cell 1 with the robot 4, and a box output conveyor 6 may be similarly arranged within reach of the box handling robot 4, for removing full boxes FB from the packing cell 1 with the robot 4.

A support unit 3 (see enlarged detail of FIG. 2) may be arranged between the picking robot 20 and the box handling robot 4. In FIG. 2 one such support unit 3 is shown enlarged, but a second support unit may be provided adjacent the support unit 3.

Each support unit 3 may have coupled to it a build-up base 7, as shown in the enlargement of FIG. 2 for support unit 3. The build-up base 7 will be described in more detail below.

The assembly of the support unit 3 and the build-up base 7 makes a stack positioner 8, as shown in the enlarged detail of FIG. 2. A second stack positioner 8' is also shown in the packing cell 1 in FIG. 1.

Figures 3A, 3B:
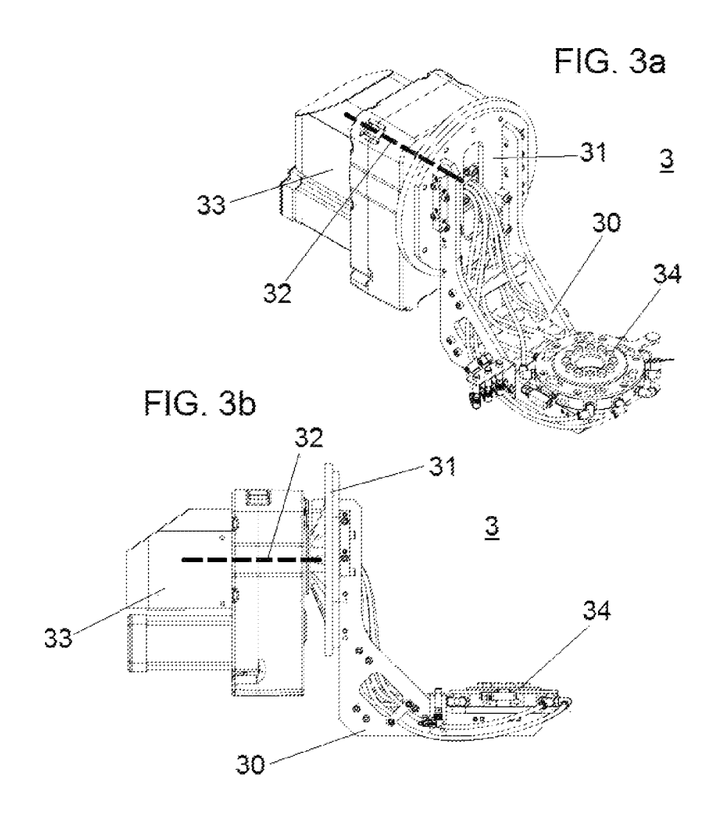
FIGS. 3a and 3b show an example of a support unit as disclosed herein.

A support unit 3 according to an example is shown in more detail in FIGS. 3a and 3b.

FIGS. 3a and 3b show in perspective view and side view a support unit 3 including a support platform 30. The support platform 30 may be attached to a mounting plate 31, which in turn may be keyed in rotation to a rotatable shaft 32 (not visible in the figures and indicated with a dotted reference line), driven by a motor 33 and intended to be arranged horizontal during use. The support platform 30 may therefore be rotated around a horizontal axis, and oriented or placed in a suitable angular position for a stacking operation.

The support unit 3 may be attached to the structure of the packing cell, for example at one side of the product feeding conveyor 21 or on a profile of the frame 22, with the rotatable shaft 32 horizontal and at right angles to the direction of advance of the conveyor 21; the support platform 30 may therefore rotate in a vertical plane parallel to the direction of advance of the conveyor 21.

The rotatable support platform 30 may have attached to it a tool changer master plate 34. By tool changer, also known as a quick-change device, it is meant a coupling device with two mating parts, usually referred to as master plate and tool plate, which are designed to lock or couple together, either manually or automatically, and have the ability to pass from one side to the other utilities such as electrical signals, pneumatic, and/or other. They may also be designed to carry a payload. The master plate usually carries a lock, for example mechanical or pneumatic, and the tool side carries suitable elements to be engaged by the lock. A tool changer employed in examples of the present disclosure may be of any known type, for example it may be an automatic tool changer that uses pneumatics to lock the two parts together.

Figure 4:
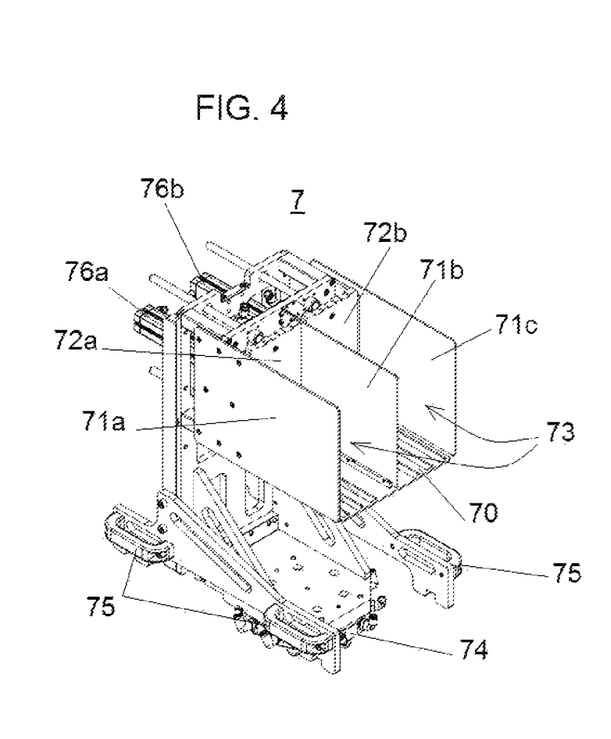
FIG. 4 shows an example of a build-up base as disclosed herein.

FIG. 4 shows in perspective view a build-up base 7 according to one example, which may be mounted on a support unit such as support unit 3 of FIGS. 3a and 3b to form a stack positioner 8, as shown by way of example in FIG. 2, for packing products conveniently stacked in boxes.

As shown, the build-up base 7 may include a bottom 70 and a number of walls 71a, 71b, 71c, 72a, 72b, defining between them a holding space 73. When the stack positioner 8 is in operation in a packing cell 1 such as shown in FIG. 2, the picking robot 20 may take products from the product feeding conveyor 21 and stack them according to a programmed stacking pattern in the holding space 73 of the build-up base 7: in this case, in a double array separated by wall 71b.

Furthermore, the build-up base 7 shown in FIG. 4 may be suitable for example for vertical stacking, since the absence of one side wall allows the picking robot 20 to enter the holding space 73 from the open side and place the products vertically, one next to the other in each row of the array.

Moreover, the build-up base 7 shown in FIG. 4 may be suitable for example for horizontal stacking, by adding a displaceable and/or rotatable wall (not shown) to the top side of the build-up base 7, and rotating the support platform 30 with the build-up unit 7 (FIG. 5a) until the walls 72a and 72b are arranged horizontal and parallel to the direction of advance of the conveyor 21 (FIG. 2).

Still with reference to FIG. 4, it may be seen that in the lower side, the build-up base 7 may include a tool changer tool plate 74, adapted to mate with the tool changer master plate 34 of the support unit 3, such that mounting or removing the build-up base 7 to or from the support unit 3 may be fast and easy.

The build-up base 7 may further have handles 75 for gripping and carrying it.

At least some walls of the build-up base 7, such as walls 71a, 71b, 71c, 72a, 72b, may be linearly displaceable or rotatable, and suitable motors or actuators may be provided to change the position as convenient, for example to provide holding spaces of different sizes. For example, linear actuators 76a and 76b visible in FIG. 4 may be provided for displacing walls 72a and 72b, respectively.

Figure 5A:
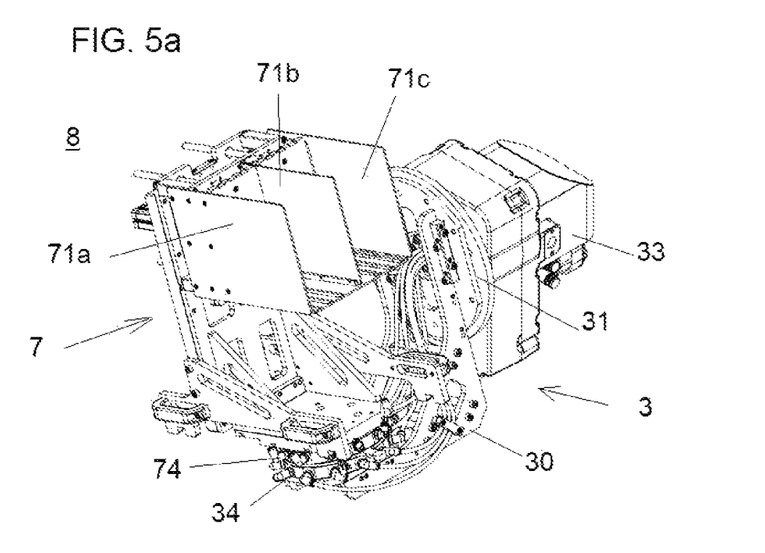
FIGS. 5a and 5b show the build-up base of FIG. 4 coupled to the support unit of FIGS. 3a, 3b.
Figure 5B:
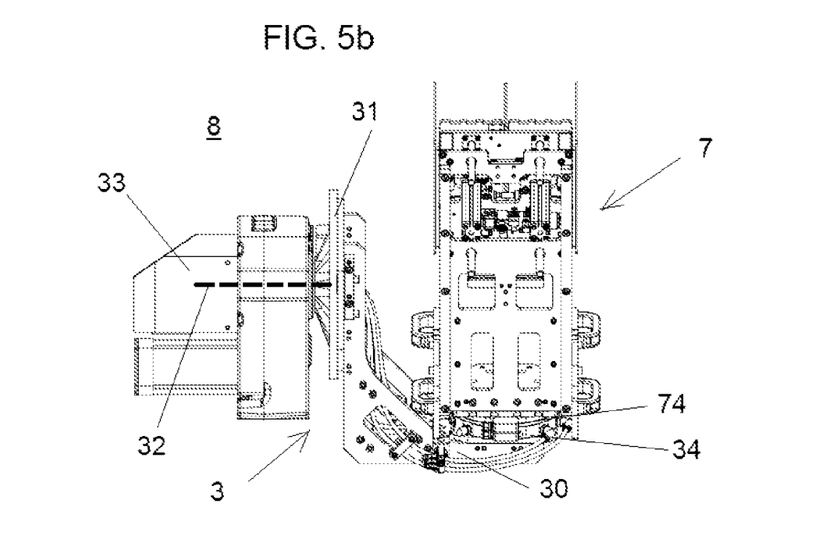

FIGS. 5a and 5b show in perspective view and side view a stack positioner 8, including a support unit 3, such as that of FIG. 3a, 3b, and a build-up base 7 such as that of FIG. 4, attached to each other by the coupling of the master plate 34 of the support unit 3 and the tool plate 74 of the build-up base 7, like visible also in the packing cell 1 of FIG. 2.

A packing cell 1 according to examples of the present disclosure may include more than one support unit 3, and therefore more than one stack positioner 8.

Figure 6:
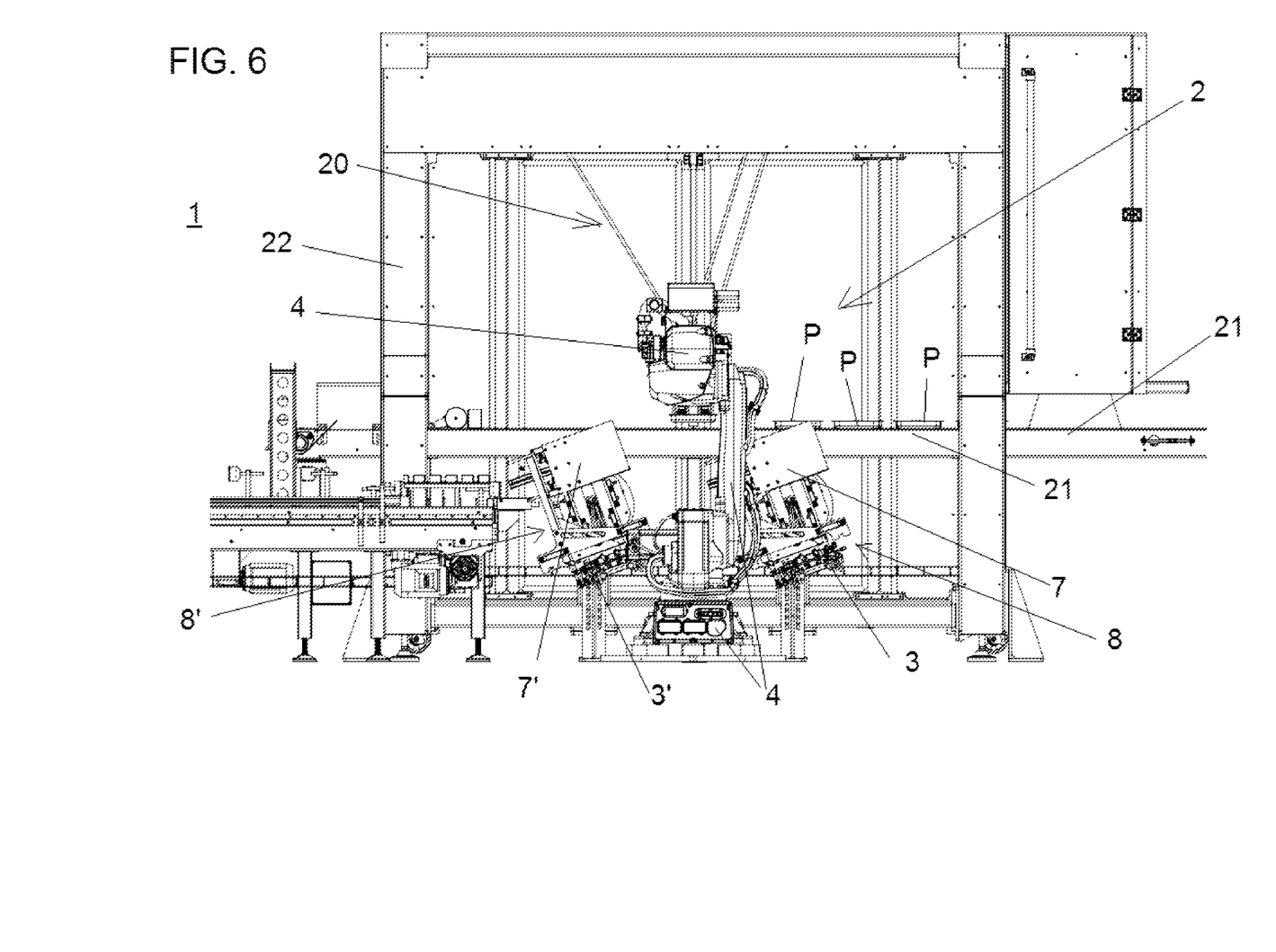
FIG. 6 shows a partial front elevation view of a packing cell according to an example of the present disclosure, having two support units.

FIG. 6, for example, is a partial view in elevation of a packing cell 1 showing more clearly than FIG. 2 the two stack positioners 8 and 8', arranged side by side and adjacent to the frame 22 under the product feeding conveyor 21. In the figure, the supports 3 and 3' of the two stack positioners 8 and 8' have attached to them identical build-up bases 7 and 7', but they may also be provided with different build-up bases and may be operated with their support platforms arranged in different positions, such that the packing cell 1 may stack products in two different boxes and/or with different stacking patterns, in the same operation.

Figure 7:
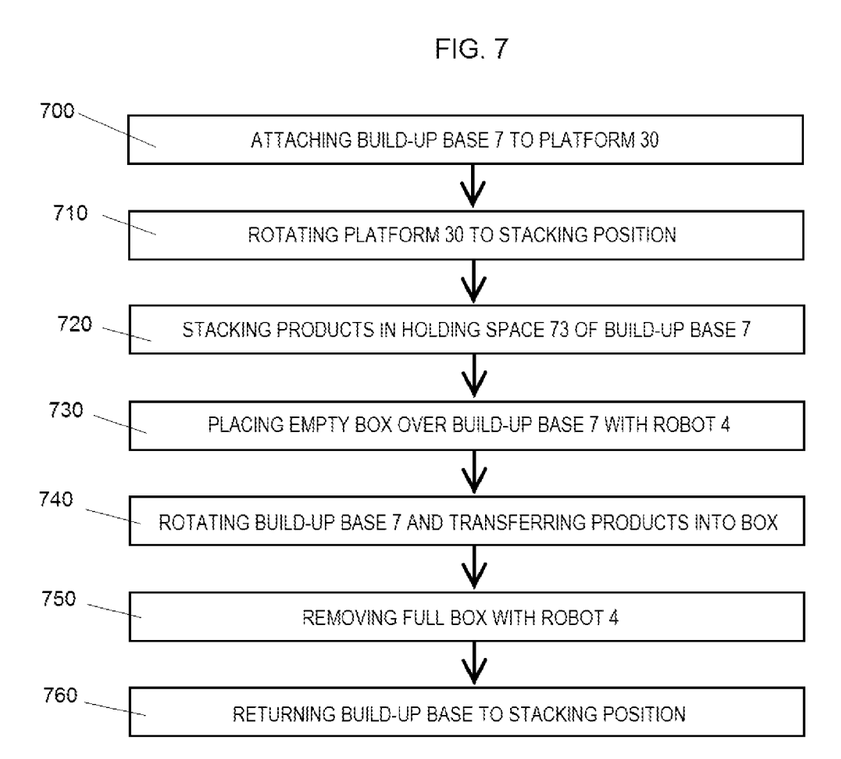
FIGS. 7, 8 and 9 are flowcharts of example methods for packing products in boxes, according to the present disclosure.

Turning back to FIG. 2, an example packing cell 1 such as shown in this figure and with a stack positioner 8 as described with reference to FIGS. 5a and 5b may operate according to the following example method, as illustrated in the flowchart of FIG. 7, to stack products vertically and in a double array in a box of the type illustrated by way of example in FIG. 1 (EB and FB).

The support unit 3 of the stack positioner 8 is fixed in the packing cell 1, on the side of the product feeding conveyor 21 from which the picking robot 20 may pick the products to be packed, with the rotatable shaft 32 in horizontal position.

In block 700, the build-up base 7 is attached to the support platform 30 of the support unit 3 by coupling together the master plate 34 and tool plate 74 of the tool changer system.

In block 710, the motor 33 and shaft 32 of the support unit 3 may be rotated through an angle, to arrange the support platform 30 and the build-up bases 7 in a stacking position, for example inclined a suitable angle for vertical stacking, as shown in FIGS. 2, 5a, 5b.

Then, in block 720, the picking robot 20 may start picking products from the conveyor 21 and stacking them vertically and in double array in the holding space 73 of the build-up base 7, between walls 72a and 72b, and between walls 72b and 72c.

Once the predetermined number of products to fill a box are stacked on the build-up base 7, in block 730 the box handling robot 4 may take an empty box EB from the box feeding conveyor 5, and place it, upside down, over and around the build-up base 7, e.g. around at least part of the walls and the stacked products.

In block 740 the motor 33 and shaft 32 of the support unit 3 may rotate the support platform 30 with the build-up base 7, the stacked products and the box, through an angle of between 90° and 180°, until the build-up base 7 and the box are substantially inverted, and the products may be transferred from the build-up base 7 into the box.

According to one example, the box handling robot 4 may hold the box in position on the build-up base 7 during the rotation of the build-up base 7, in a synchronized operation. According to other examples, the robot 4 may withdraw after placing the box on the build-up base 7, and the base itself may hold the box attached to it during the rotation, for example by a gripper (not shown).

In both these examples, at the end of the rotation, in block 750, the box handling robot 4 transfers the box, which is now full, to the box output conveyor 6, which removes the full box FB from the packing cell 1.

In block 760 the support platform 30 and the build-up bases 7 are rotated to place them back in the stacking position for the next cycle.

In order to assist in transferring the products from the build-up base 7 into the box, instead of relying only on gravity, the build-up base 7 may include a pusher (not shown) for pushing the stacked products away from the bottom 70 of the build-up base 7.

Moving walls of a build-up base 7, such as walls 72a and 72b in FIG. 4, may also be employed to first configure the build-up base 7 in a stacking condition, in which the holding space is larger, allowing some tolerance in the stacking operation, so the picking system may operate faster, and then, once the products are stacked in the holding space, configure the build-up base 7 in a product-transfer condition, in which some walls may be moved to reduce the holding space, enclosing the products in a smaller volume. This may allow packing the same number of products in a smaller box to reduce transport and storage costs.

When a packing cell includes two stack positioners 8 and 8', such as in FIG. 6, the picking robot 20 may stack products on one stack positioner 8, while the products previously stacked in the other build-up base 7' of the other stack positioner 8' are transferred into a box, the box is removed, and the stack positioner 8 rotates back to the suitable stacking position, ready to receive products.

A packing cell 1 may include several different build-up bases 7, each provided with a tool changer tool plate 74, adapted to be coupled to the tool changer master plate 34 of a support unit 3, to form different stack positioners 8. Each build-up base 7 may be constructed with different dimensions, walls, actuators, etc., for example adapted to one kind of box. A build-up base 7 may also be able to adapt for example to a number of different boxes, e.g. by rotating, linearly displacing or adding/removing one or more walls.

One build-up base or another may be coupled to a support unit 3 of the packing cell 1 for a certain packing operation, depending on the boxes to be filled, the stacking pattern, etc. When a different kind of boxes has to be filled in a subsequent packing operation, the build-up base may be easily replaced with a different one by virtue of the tool changer system.

A packing cell 1 may also include stack positioners (not shown) where the holding space of the build-up base is configured and dimensioned for holding a box, such that the box may directly receive the products from the picking system 2.

Such build-up base or bases may include a bottom and a holding space over the bottom, configured to hold a box.

Figure 8:
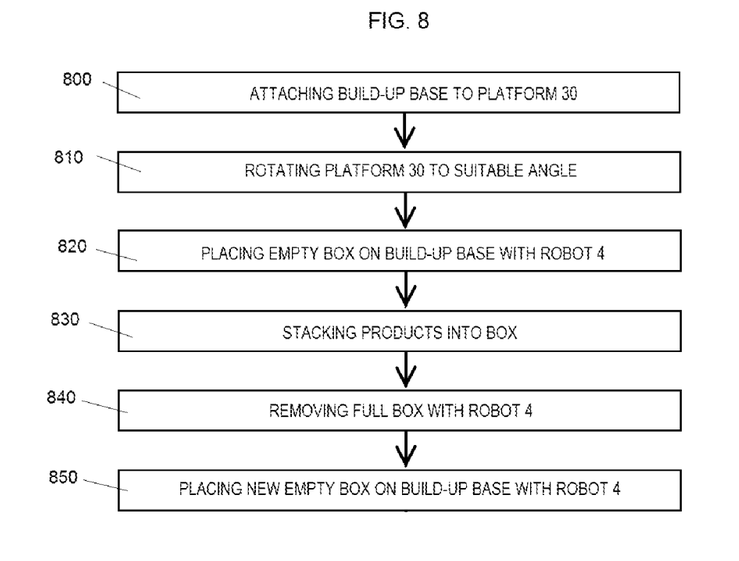

A packing cell 1 such as shown in FIG. 2 and with a support unit 3 as described with reference to FIGS. 3a, 3b but with a build-up base (not shown) configured for holding a box, may operate according to the example method illustrated in the flowchart of FIG. 8, to stack products directly in the box, for example a box of the type illustrated by way of example in FIG. 1 (EB and FB).

The support unit 3 is fixed in the packing cell 1, connected to the frame 22 below or on the side of the product feeding conveyor 21 from which the picking robot 20 may pick the products to be packed, with the rotatable shaft 32 in horizontal position.

In block 800, the build-up base is attached to the support platform 30 of the support unit 3 by coupling together the master plate 34 of the support unit and the tool plate of the build-up base.

In block 810, the motor 33 and shaft 32 of the support unit 3 may be rotated through an angle, to arrange the support platform 30 and the build-up base inclined a suitable angle for vertical stacking; or arrange the support platform 30 and the build-up base horizontal, for horizontal stacking.

In block 820 the box handling robot 4 may take an empty box from the box feeding conveyor 5 and place it on the build-up base on the support unit 3.

Then, in block 830, the picking robot 20 may start picking products from the conveyor 21 and stacking them vertically inside the box placed on the build-up base.

Once a predetermined number of products are stacked in the box, in block 840 the box handling robot 4 may take the full box from the build-up base and place it on the box output conveyor 6, which removes the full box FB from the packing cell 1.

Next, in block 850, the box handling robot 4 may take a new empty box from the box feeding conveyor 5 and place it on the build-up base on the support unit 3, for the next cycle.

A packing cell with two support units, such as 3 and 3' in FIG. 2, may also operate as described with reference to FIG. 8; in such a case, for example, the picking robot 20 may stack products in a box placed on the build-up base on one support unit 3, while the box-handling robot 4 is removing a full box FB from the build-up base of another support unit 3', and providing a new empty box EB thereon.

Figure 9:
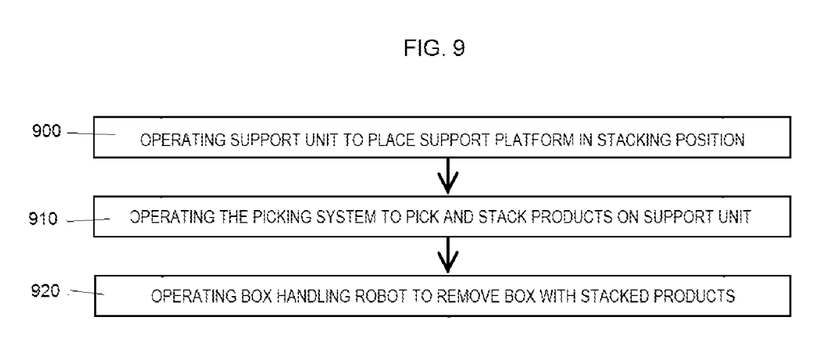

Further example methods for packing products in boxes, which may employ a packing cell according to any of the examples disclosed above, may generally include, as illustrated in the flowchart of FIG. 9:

In block 900, operating a support unit to place a support platform mounted on a rotatable shaft in a stacking position, e.g. in a predetermined angular position adjacent a product picking system, In block 910, operating the picking system to pick and stack a number of products according to a predetermined stacking pattern on the support unit, and In block 920, operating a box handling robot to remove from the support unit a box containing the stacked products.

In some examples, at least two build-up bases, adapted to different box types, may selectively be mounted on the support platform of the support unit, depending on the box to be filled. The mounting of the different build-up bases on the support unit may be made by providing mating tool changer elements, as disclosed herein for implementations of the packing cell.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow. If reference signs related to drawings are placed in parentheses in a claim, they are solely for attempting to increase the intelligibility of the claim, and shall not be construed as limiting the scope of the claim.

The invention claimed is:

1. A packing cell for packing products in boxes, comprising:
   a picking system for
      picking products and
      stacking them according to a stacking pattern,
   a support unit for the stacking process, the support unit comprising
      a support platform comprising a tool changer master plate, and
      a rotatable horizontal shaft for placing the support platform in a predetermined angular position for the stacking process, and
   a box handling robot arranged to transfer
      empty boxes towards the support unit and
      full boxes away from the support unit.

2. A packing cell according to claim 1, the packing cell further comprising one or more build-up bases, each provided with a tool changer tool plate adapted to be coupled to the tool changer master plate of the support unit.

3. A packing cell according to claim 2, one or more of the build-up bases comprising a bottom and one or more walls defining between them a holding space.

4. A packing cell according to claim 3, one or more of the walls being one or both rotatable and linearly displaceable.

5. A packing cell according to claim 2, one or more of the build-up bases being adapted to support boxes for receiving the products from the picking system.

6. A packing cell according to claim 1, comprising at least two support units for the stacking process, each of the at least two support units comprising a support platform with a tool changer master plate and a rotatable horizontal shaft for rotating the support platform.

7. A packing cell according to claim 1, further comprising a box feeding conveyor, arranged within reach of the box handling robot, for feeding empty boxes to the packing cell.

8. A packing cell according to claim 1, further comprising a box output conveyor arranged within reach of the box handling robot, for removing full boxes from the packing cell.

9. A packing cell according to claim 1, the picking system comprising a product feeding conveyor and picking robot arranged to pick products from conveyor and stack them on the support units.

10. A packing method for packing products in boxes, comprising:
    operating a support unit to place a support platform mounted on a rotatable shaft in a predetermined angular position adjacent a product picking system,
    operating the picking system to pick and stack a number of products according to a predetermined stacking pattern on the support unit, and
    operating a box handling robot to remove from the support unit a box containing the stacked products; and
    providing at least two build-up bases adapted to different box types and mounting one of the build-up bases on the support platform of the support unit before placing the support platform of the support unit in a predetermined angular position.

11. A method according to claim 10, the operating the box handling robot to remove from the support unit the box containing the stacked products further comprising:
    operating the handling robot to place an empty box on the stacked products on the support unit, and
    operating the support unit to rotate the support platform to transfer the stacked products into the empty box, and
    operating the handling robot to remove the box from the support unit.

12. A method according to claim 11, the operating the support unit to rotate the support platform to transfer the stacked products into the empty box further comprising operating the box handling robot to rotate the box synchronized with the rotation of the support platform.

13. A method according to claim 10, further comprising,
    before the operating the picking system to pick and stack products on the support unit, operating the box handling robot to place an empty box on the support unit to receive the products from the picking system.

14. A method according to claim 10, comprising
    providing the support platform of the support unit with a tool changer master plate, and
    providing each build-up base with a tool changer tool plate adapted to be coupled to the tool changer master plate of the support platform, and
    the mounting one of the build-up bases on the support platform of the support unit further comprising
    coupling together the tool changer master plate of the support platform and the tool changer tool plate of the build-up base.

15. A packing cell for packing products in boxes, comprising:
    a picking system for picking products and stacking them according to a predetermined stacking pattern;
    a support platform for the stacking process;
    a rotatable horizontal shaft for placing the support platform in a predetermined angular position for the stacking process;
    a box handling robot arranged to transfer empty boxes towards the support platform and full boxes away from the support platform;
    one or more build-up bases defining a holding space; and
    a tool changer system for attachment of the build-up bases to the support unit, the tool changer system comprising a master plate and one or more tool plates,
    the support platform being provided with the master plate of the tool changer system and each build-up base being provided with a tool plate of the tool changer system.

* * * * *